US00RE44799E

(19) United States
(12) Reissued Patent
Chiang et al.

(10) Patent Number: US RE44,799 E
(45) Date of Reissued Patent: Mar. 11, 2014

(54) ELECTRONIC DEVICE HOUSING

(71) Applicants: Shenzhen Futaihong Precision Industry Co., Ltd., ShenZhen (CN); FIH (Hong Kong) Limited, Kowloon (HK)

(72) Inventors: Chwan-Hwa Chiang, Taipei Hsien (TW); Qi-Jian Du, Shenzhen (CN)

(73) Assignees: Shenzhen Futaihong Precision Industry Co., Ltd., Shenzhen (CN); FIH (Hong Kong) Limited, Kowloon (HK)

(21) Appl. No.: 13/815,412

(22) Filed: Feb. 28, 2013

Related U.S. Patent Documents

Reissue of:
(64) Patent No.: 8,076,011
Issued: Dec. 13, 2011
Appl. No.: 12/949,938
Filed: Nov. 19, 2010

(30) Foreign Application Priority Data

Dec. 29, 2009 (CN) ..... 2009 1 0312514

(51) Int. Cl.
*B23B 9/00* (2006.01)

(52) U.S. Cl.
USPC ..... 428/696; 428/701; 428/702

(58) Field of Classification Search
None
See application file for complete search history.

(56) References Cited

U.S. PATENT DOCUMENTS

2008/0261008 A1* 10/2008 Kiyokawa et al. ..... 428/216

FOREIGN PATENT DOCUMENTS

| | | | |
|---|---|---|---|
| JP | 10-20102 | * | 1/1998 |
| JP | 10020102 A | * | 1/1998 |
| JP | 2008-225210 | * | 9/2008 |
| JP | 2008225210 A | * | 9/2008 |

OTHER PUBLICATIONS

Niizaka JP 10-20102 Machine English Translation.*
Fujii JP 2008-225210 Machine English Translation.*

* cited by examiner

*Primary Examiner* — David Sample
(74) *Attorney, Agent, or Firm* — Altis Law Group, Inc.

(57) ABSTRACT

An electronic device housing is provided. The electronic device housing comprises a substrate, a base paint coating formed on the substrate, and a metallic coating formed on the base paint coating. The metallic coating comprises a plurality of first layers interleaved with a plurality of second layers, and a third layer provided outermost. The first layer and the second layer are respectively a zirconium dioxide layer and an aluminum oxide layer, or are respectively composite component layer of niobium pentoxide and zirconium dioxide, and silicon dioxide layer. The third layer is a magnesium fluoride layer.

12 Claims, 2 Drawing Sheets

ELECTRONIC DEVICE HOUSING

Matter enclosed in heavy brackets [ ] appears in the original patent but forms no part of this reissue specification; matter printed in italics indicates the additions made by reissue.

CROSS-REFERENCE TO RELATED APPLICATIONS

This application is one of the three related co-pending U.S. patent applications listed below. All listed applications have the same assignee. The disclosure of each of the listed applications is incorporated by reference into all the other listed applications.

| Title | Inventors | Application No. | Filing Date |
|---|---|---|---|
| ELECTRONIC DEVICE HOUSING | QI-JIAN DU et al. | 12/891,904 | Sep. 28, 2010 |
| ELECTRONIC DEVICE HOUSING | QI-JIAN DU et al. | 12/949,938 | Nov. 19, 2010 |
| ELECTRONIC DEVICE HOUSING AND METHOD FOR MAKING THE SAME | QI-JIAN DU et al. | 12/949,955 | Nov. 19, 2010 |

BACKGROUND

1. Technical Field

The present disclosure relates to electronic device housings, particularly to an electronic device housing having a metallic and color changeable appearance.

2. Description of Related Art

Decorative metallic coatings are often deposited on housings of electronic devices. The metallic coatings are typically formed by vacuum deposition to be nonconductive so as not to block electromagnetic waves. These metallic coatings may be transparent or translucent. However, the metallic coatings cannot present a color changeable appearance.

Therefore, there is room for improvement within the art.

BRIEF DESCRIPTION OF THE FIGURES

Many aspects of the electronic device housing can be better understood with reference to the following figures. The components in the figures are not necessarily drawn to scale, the emphasis instead being placed upon clearly illustrating the principles of the electronic device housing. Moreover, in the drawings like reference numerals designate corresponding parts throughout the several views.

DETAILED DESCRIPTION

Figure 1:
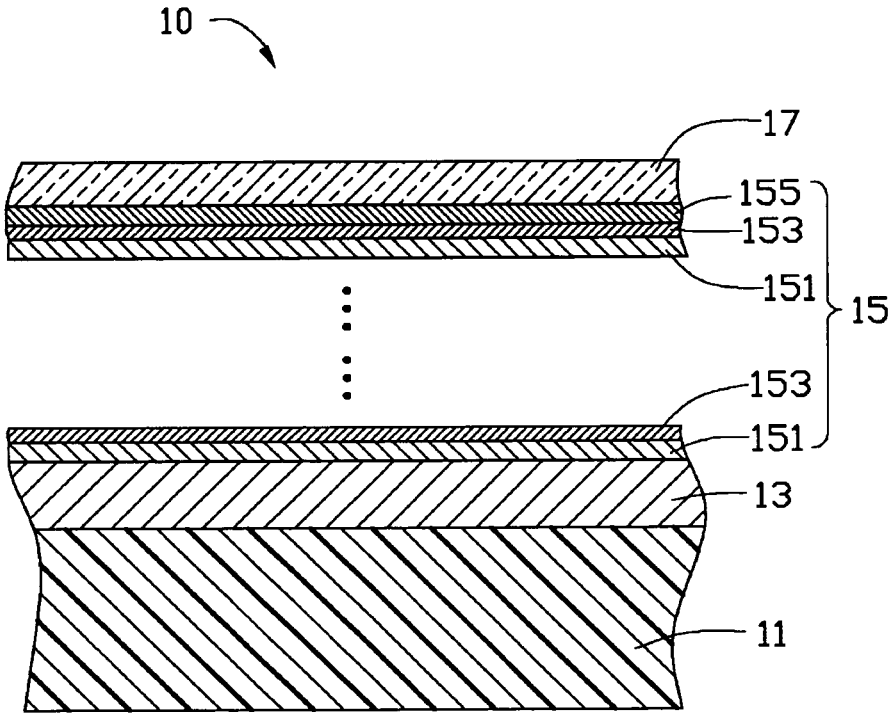
FIG. 1 is a cross-section of an of an electronic device housing according to an exemplary embodiment.
Figure 2:
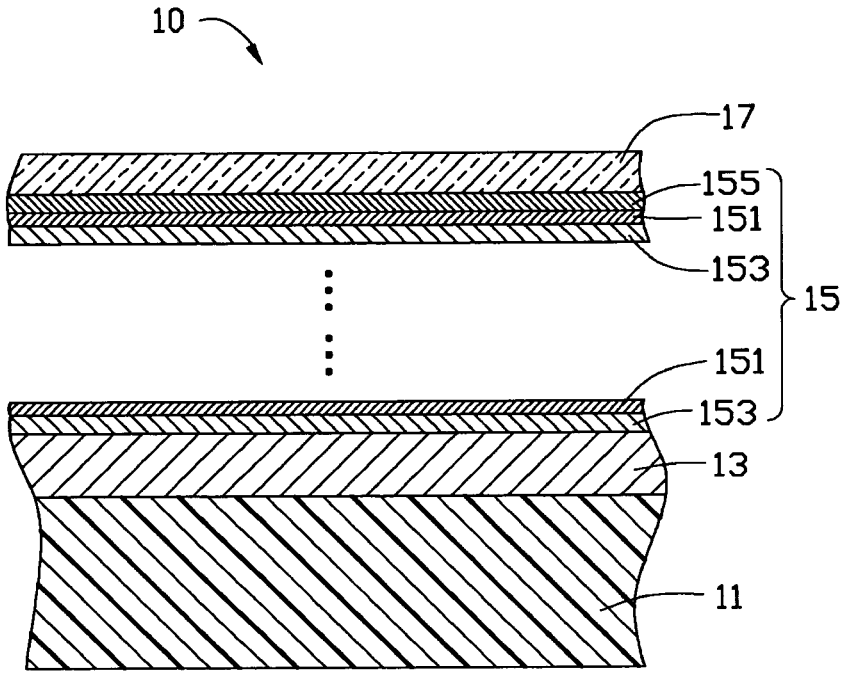
FIG. 2 is another cross-section of an exemplary embodiment of the electronic device housing.

FIG. 1 and FIG. 2 show an electronic device housing 10 according to an exemplary embodiment. The electronic device housing 10 includes a substrate 11, a base paint coating 13 formed on a surface of the substrate 11, a metallic coating 15 formed on the base paint coating 13, and a top paint coating 17 formed on the metallic coating 15. The electronic device housing 10 may be a housing of a mobile phone, personal digital apparatus (PDA), note book computer, MP3, MP4, GPS navigator, or digital camera.

The substrate 11 may be made of plastic material selected from a group consisting of polycarbonate (PC), polyethylene (PE), polymethyl methacrylate (PMMA), and a mixture of polycarbonate and acrylonitrile-butadiene-styrene plastics (PC+ABS). The substrate 11 may instead be made of ceramic.

The base paint coating 13 may be an acrylic resin paint coating. The base paint coating 13 may have a thickness of about 1 μm to about 30 μm. The base paint coating 13 has a smooth surface for reflecting light well, and further for enhancing bonding between the base paint coating 13 and subsequent coatings. The base paint coating 13 may be colored to present a colorful appearance for the electronic device housing 10.

The metallic coating 15 may be formed on the base paint coating 13 by vacuum sputtering or vacuum vapor deposition. The metallic coating 15 may include a plurality of first layers 151 interleaved with a plurality of second layers 153, with a second layer 153 or a first layer 151 outermost in the interleaving pattern, and a third layer 155 provided outermost. The plurality of first layers 151 may include five to ten layers. The plurality of second layers 153 may also include five to ten layers. The first layer 151 and the second layer 153 may be respectively a zirconium dioxide ($ZrO_2$) layer and an aluminum oxide ($Al_2O_3$) layer. Either one zirconium dioxide layer or either one aluminum oxide layer may be directly formed on the base paint coating 13. Alternatively, the first layer 151 and the second layer 153 may be respectively a composite component layer of niobium pentoxide ($Nb_2O_5$) and zirconium dioxide ($ZrO_2$), and a silicon dioxide ($SiO_2$) layer. Either one composite component layer of niobium pentoxide and zirconium dioxide or either one silicon dioxide layer may be directly formed on the base paint coating 13. The third layer 155 may be a magnesium fluoride layer. The third layer 155 has a thickness of about 10-150 nm. The total thickness of the metallic coating 15 may be of about 100-900 nm. The thickness of the metallic coating 15 is controlled to present a metallic appearance for the electronic device housing 10 without interfering with radio transmission capabilities.

The metallic coating 15 and the base paint coating 13 reflect light under irradiation of visible light at different incident angles. The light reflected by the metallic coating 15 has different wavelength than the light reflected by the base paint coating 13, and these different wavelengths form several intensifying interference regions. The different intensifying interference regions, when viewed by a user during relative movement between the user and the electronic device housing 10, will make the electronic device housing 10 appear to be changing and shifting colors, which will be visually interesting and appealing.

The top paint coating 17 may be a transparent paint coating and has a thickness of about 10-50 μm. The paint used for forming the top paint coating 17 may be an ultraviolet (UV) curable paint. The top paint coating 17 has a high hardness which protects the metallic coating 15 from abrasion.

It is to be understood that the top paint coating 17 may be omitted in applications where abrasion of the electronic device housing 10 is not a concern.

It should be understood, however, that though numerous characteristics and advantages of the present embodiments have been set forth in the foregoing description, together with details of functions of the embodiments, the disclosure is illustrative only, and changes may be made in detail within the principles of the disclosure to the full extent indicated by the broad general meaning of the terms in which the appended claims are expressed.

What is claimed is:

1. An electronic device housing, comprising:

a substrate;

a reflective base paint coating formed on the substrate and for reflecting light; and a metallic coating formed on the base paint coating, the metallic coating comprising:

a plurality of first layers interleaved with a plurality of second layers, and a third layer provided outermost;

wherein the first layer and the second layer are respectively a zirconium dioxide layer and an aluminum oxide layer, or are respectively a composite component layer of niobium pentoxide and zirconium dioxide, and a silicon dioxide layer; the third layer is a magnesium fluoride layer.

2. The electronic device housing as claimed in claim 1, wherein the metallic coating has a thickness of about 100-900 nm.

3. The electronic device housing as claimed in claim 1, wherein the third layer has a thickness of about 10-150 nm.

4. The electronic device housing as claimed in claim 1, wherein the metallic coating is formed by vacuum sputtering or vacuum vapor deposition.

5. The electronic device housing as claimed in claim 1, wherein the substrate is made of plastic or ceramic.

6. The electronic device housing as claimed in claim 1, wherein the plurality of first layers include five to ten layers, the plurality of second layers include five to ten layers.

7. The electronic device housing as claimed in claim 1, wherein the base paint coating is an acrylic resin paint coating having a thickness of about 1-30 μm.

8. The electronic device housing as claimed in claim 7, wherein one composite component layer of niobium pentoxide and zirconium dioxide or one silicon dioxide layer is directly formed on the base paint coating.

9. The electronic device housing as claimed in claim 7, wherein one zirconium dioxide layer or one aluminum oxide layer is directly formed on the base paint coating.

10. The electronic device housing as claimed in claim 1, further comprising a top paint coating formed on the metallic coating.

11. The electronic device housing as claimed in claim 10, wherein the top paint coating is an ultraviolet curable paint coating.

12. The electronic device housing as claimed in claim 10, wherein the top paint coating has a thickness of about 10-50 μm.

* * * * *